United States Patent [19]
Linnersten et al.

[11] Patent Number: 5,656,166
[45] Date of Patent: Aug. 12, 1997

[54] HIGH COLLAPSE PRESSURE POROUS FILTER DEVICE

[75] Inventors: Staffan B. Linnersten, Brecksville, Ohio; Anatolie Hobet, Chapel Hill, N.C.

[73] Assignee: Fleetguard, Inc., Nashville, Tenn.

[21] Appl. No.: 419,452

[22] Filed: Apr. 10, 1995

[51] Int. Cl.$^6$ ................................. B01D 27/02
[52] U.S. Cl. .................... 210/489; 210/490; 210/492; 210/496; 210/497.01; 210/510.1
[58] Field of Search ................................. 210/488, 489, 210/490, 492, 496, 497.01, 510.1; 55/523

[56] References Cited

U.S. PATENT DOCUMENTS

| | | | |
|---|---|---|---|
| 2,665,960 | 1/1954 | Causley | 210/510.1 |
| 3,693,750 | 9/1972 | Takkunen | 210/510.1 |
| 3,780,872 | 12/1973 | Pall | 210/510.1 |
| 3,984,044 | 10/1976 | Breton et al. | |
| 4,126,560 | 11/1978 | Marcus et al. | 55/523 |
| 4,287,068 | 9/1981 | Bewley | 210/497.01 |
| 4,579,658 | 4/1986 | Moller | |
| 4,721,567 | 1/1988 | Uram | 210/510.1 |
| 5,098,571 | 3/1992 | Maebashi | 210/510.1 |
| 5,202,022 | 4/1993 | Ferri | |
| 5,326,512 | 7/1994 | Stillwagon et al. | 210/510.1 |

*Primary Examiner*—W. L. Walker
*Attorney, Agent, or Firm*—Woodard, Emhardt, Naughton, Moriarty & McNett

[57] ABSTRACT

A substantially cylindrical, unitized filter element for separating contaminant material from a flowing media includes an outer, substantially cylindrical wall portion which is fabricated by a two step process involving both a compacting step followed by a sintering step. The result of these processing steps is to create a rigid, porous filtering matrix. The filter element also includes an inner, substantially cylindrical wall portion which is also constructed through a two step process of a granular material which has been compacted and sintered into a rigid and porous filtering matrix. Disposed between the two cylindrical wall portions is a substantially cylindrical structural support member which is fabricated from a non-restrictive material and a material which is compatible with the material selected for the inner and outer wall portions. The structural support member is positioned between the two wall portions prior to the compacting process step and is sintered to the outer and inner wall portions in order to create a unitized filter element.

17 Claims, 4 Drawing Sheets

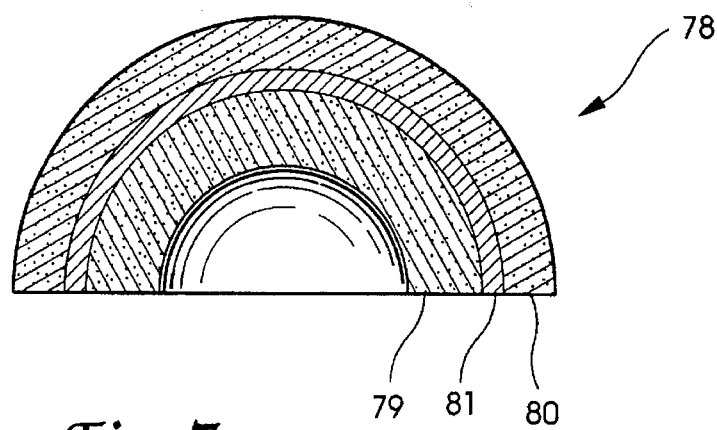
Fig. 7
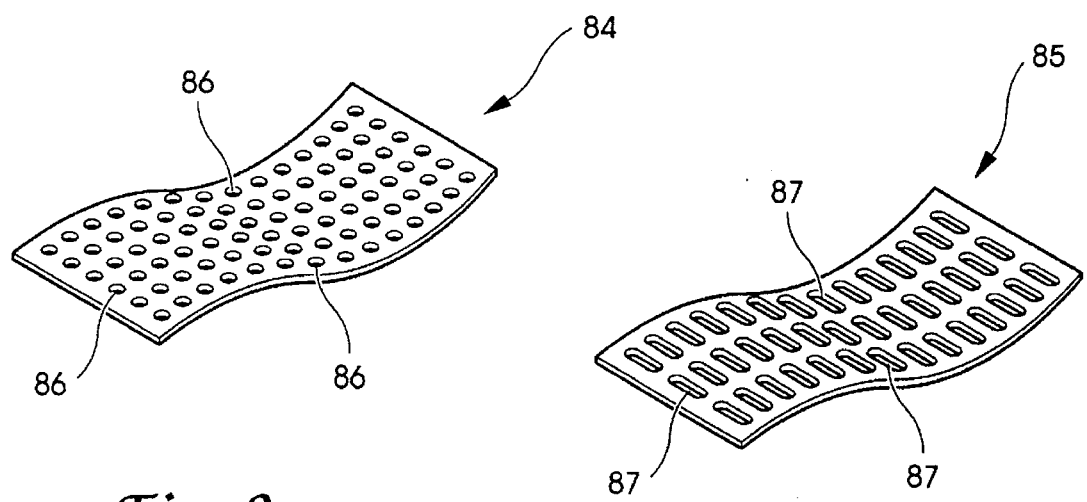
Fig. 8
Fig. 9

HIGH COLLAPSE PRESSURE POROUS FILTER DEVICE

BACKGROUND OF THE INVENTION

The present invention relates generally to the use of a sintered granular metal as part of a porous filter element for use within a filter cartridge or as a separate filtering device. More specifically the present invention relates to the use of a non-restrictive structural support member as part of a porous filter element which is formed by using a sintered granular metal.

It is generally known that sintered powder metal can be used as a filtering element for mechanically separating suspended matter from a liquid or gaseous fluid medium. There are a number of different materials which may be used and a variety of design options for the filter assembly. One such design is disclosed in U.S. Pat. No. 3,984,044 which issued Oct. 5, 1976 to Breton, et al. The Breton et al. patent describes a filter structure which comprises at least two laminated, porous, plate-like filter structures having relatively large planar front and rear surfaces joined by relatively small edge surfaces arranged substantially parallel to each other and spaced up to approximately five, and preferably less than one, inches apart. Each filter structure comprises at least two contacting and adhered, substantially coextensive porous layers whose pores are in open communication over substantially all of the interface between their contiguous surfaces so as to permit flow of the fluid medium from one layer to the other. One of the layers is a retention layer for the suspended matter having a pore size sufficiently small substantially to prevent passage of the suspended matter to be removed from the fluid medium and the other of the layers is a supporting layer having a pore size larger than the pore size of the retention layer.

The Breton, et al. patent states that the object of the described mechanical separation, specifically clarification by filtration, is for clarifying hot, viscous, liquid suspensions such as the clarification of polymer melts and polymer solutions as is required immediately preceding an extrusion operation. The claimed novelty of the Breton, et al. invention is said to reside in a series of plate-like filter structures which provide a high ratio of retention surface area per unit volume of filter element, this ratio ranging from between 4 and 60 or 70.

Other porous filter element designs are disclosed by U.S. Pat. No. 5,202,022 which issued Apr. 13, 1993 to Ferri and U.S. Pat. No. 4,579,658 which issued April 1, 1986 to Moller. The Ferri patent discloses a porous filter support plate of the kind used in traveling bridge filters for the support of granular filter media which is used in the filtration of waste water, industrial liquors or baths, or for filtration of potable water in a water purification system. The support plates are formed of porous, heat-fusable materials, for example, a thermoplastic organic material, joined together by heat, fused, butt joints and/or reinforced by vertical zones which extend vertically through the plates in which the material has been brought to a molten state and is pressed together to form a dense, solid, non-porous mass.

The Moller patent discloses a sheet-like filter element which includes a porous or fibrous filtering layer and a pair of opposite cover layers. The cover layers are maintained in tight engagement with the outer surfaces of the filtering layer by means of transversely extending connecting strings. The filter element may, for example, be used as a filter for a gas venting opening in a stoma bag, and in that case the porous filtering layer contains a large amount of finely granulated activated carbon. The connecting strings maintain the cover layers pressed against the filtering layers so as to avoid any tendency of delamination of the filtering layer and formation of undesired spaces or passages therein.

The use of sintered granular metals (powder metal), such as stainless steel, steel, copper/nickel alloys, bronze and brass, for filter elements can provide certain advantages. For example, these filter elements offer the advantages of high efficiency, rigid pores and filter elements which are non-migrating. There is though one limitation to the present state in the art in sintered granular metal filter elements. These filter elements have a relatively low resistance to high differential pressures such as those pressures present in high pressure fluid systems. If the wall thickness of the sintered granular metal filter element is increased so as to resist the high differential pressures, then the resulting pressure losses through the filter element will be prohibitive.

In order to address the primary limitation of sintered granular metal filter elements and solve this problem in a novel and unobvious manner, the present invention was conceived. The present invention provides a high collapse pressure, porous filter element (and device) which combines the desired (correct) filtration performance with higher structural strength in a unitized filter element. This preferred combination of filter element features is achieved by placing a non-restrictive structural support member in the granular metal (power metal) prior to the compacting step in the forming die. When the "green compact" is produced, it has the size and shape of the finished filter element with the structural support member embedded therein. The amount (volume) of granular metal which is used for the filter element relative to the size of the compacting die and the individual granule size controls the pore size and density of the filter element.

During the sintering step, the oven temperature reaches a level which is at or just below the melting temperature of the granular material. When the temperature is held at this level, the contact points between adjacent and abutting metal granules are fused or welded together. The result is a rigid filter element with fixed, rigid tortuous pores (passages). The structural support member is locked into the metal granules and is similarly fused or welded therewith so as to create the desired filter element as a single, unitized component.

SUMMARY OF THE INVENTION

A substantially cylindrical, unitized filter element for separating contaminant material from a flowing media according to one embodiment of the present invention comprises an outer, substantially cylindrical wall portion constructed of a granular material which has been sintered into a porous filtering matrix; an inner, substantially cylindrical wall portion constructed of a granular material which has been sintered into a porous filtering matrix; and a substantially cylindrical structural support member positioned between and sintered to the outer and inner wall portions.

One object of the present invention is to provide an improved filter element.

Related objects and advantages of the present invention will be apparent from the following description.

BRIEF DESCRIPTION OF THE DRAWINGS

FIG. 7 is a front elevational view in full section of a filter element according to the present invention.

FIG. 8 is a perspective view of a sheet of material suitable for fabricating a structural support member which comprises a portion of the FIG. 1 filter element.

FIG. 9 is a perspective view of a sheet of material suitable for fabricating a structural support member which comprises a portion of the FIG. 1 filter element.

DESCRIPTION OF THE PREFERRED EMBODIMENT

Figure 1:
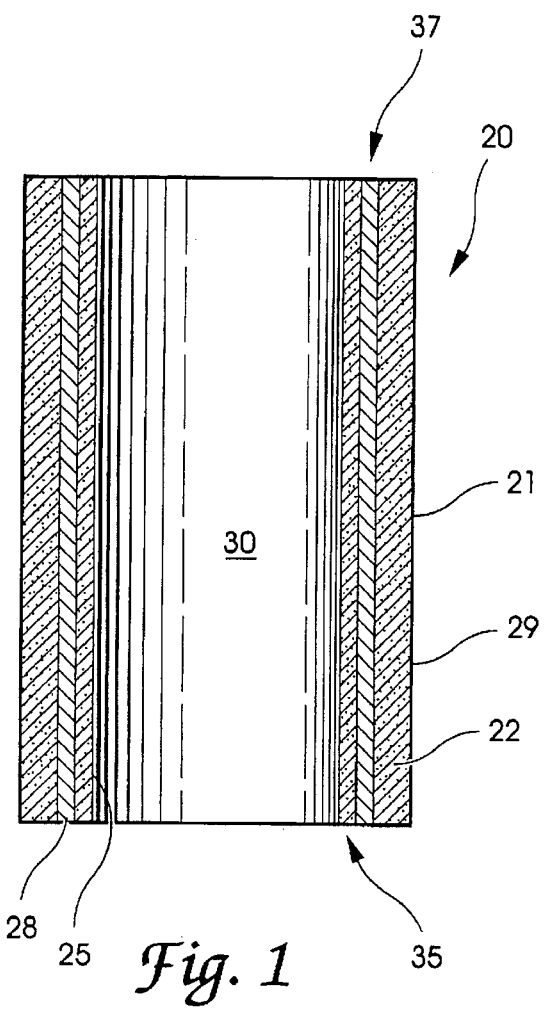
FIG. 1 is a front elevational view in full section of a filter element according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated a unitized filter element 20 which is constructed according to the present invention. Filter element 20 is a hollow, substantially cylindrical member which has a uniform and generally symmetrical configuration relative to any diametral cutting plane. The wall 21 of filter element 20 includes three layers beginning with outer wall portion 22. Wall portion 22 is fabricated out of a granular material which is first compacted and then sintered so as to create a rigid, porous wall portion. Suitable materials for the granular material include metals, ceramics, and plastics. Although "compacting" and "sintering" steps are typically associated with powder metal technology, it is possible to use ceramic or plastic granules and generally process these materials in the same way as would be done for powder metal. The innermost wall portion 25 is also fabricated out of a granular material which is first compacted and then sintered so as to create a rigid, porous wall portion. While wall portion 25 could actually be fabricated out of a granular metal, ceramic, or plastic, it is preferred for the same material to be used for wall portions 22 and 25. However, the granule sizes of the selected material may be different so as to vary the porosity of the fabricated wall portions. For example, if wall portion 22 is fabricated with larger granules, a coarser (more porous) wall portion will result. By using smaller granules for wall portion 25, a finer (less porous) filtering wall portion is the result.

While different materials could in fact be used for the two wall portions 22 and 25, there are practical considerations which suggest that use of the same material is preferred. During the compacting step, a controlled amount of material is placed into a precision die and the loose granules are compressed. The desired result is to produce a "green compact" which has enough rigidity for careful handling but minimal structural strength. The pressure (pressing force) required to create a green compact will depend in part on the type of material and in part on the desired density. When the green compact is placed in a sintering oven, the objective is to heat the part to a temperature which is just below the melting point of the granule material. As this temperature is held, bonds between the individual granules are created through a type of heat-fusing or welding process. If different materials are used for wall portions 22 and 25, different sintering temperatures could be required.

After sintering, the wall portions are rigid and porous with a random arrangement of pores and tortuous passageways. If the outer wall portion 22 is a coarser filter and the inner wall portion 25 a finer filter, then the outer wall portion will trap only the larger particles or contaminants, allowing the inner wall portion to filter out smaller particles and contaminants. If left unsupported, wall portions 22 and 25 will have a relatively low resistance to high differential pressures such as those levels which are present in high pressure fluid systems. If the wall thickness is increased in an effort to try and add structural strength, then prohibitive pressure losses will result.

Therefore, according to the present invention, a structural member 28 is positioned between outer wall portion 22 and inner wall portion 25. Structural member 28 is a substantially cylindrical member which is preferably fabricated out of a material which is the same basic material as that used for the two wall portions. The resulting combination is a self-supporting, high collapse pressure porous filter element. Filter element 20 provides the correct filtration performance with high structural strength in a unitized device.

Figure 10:
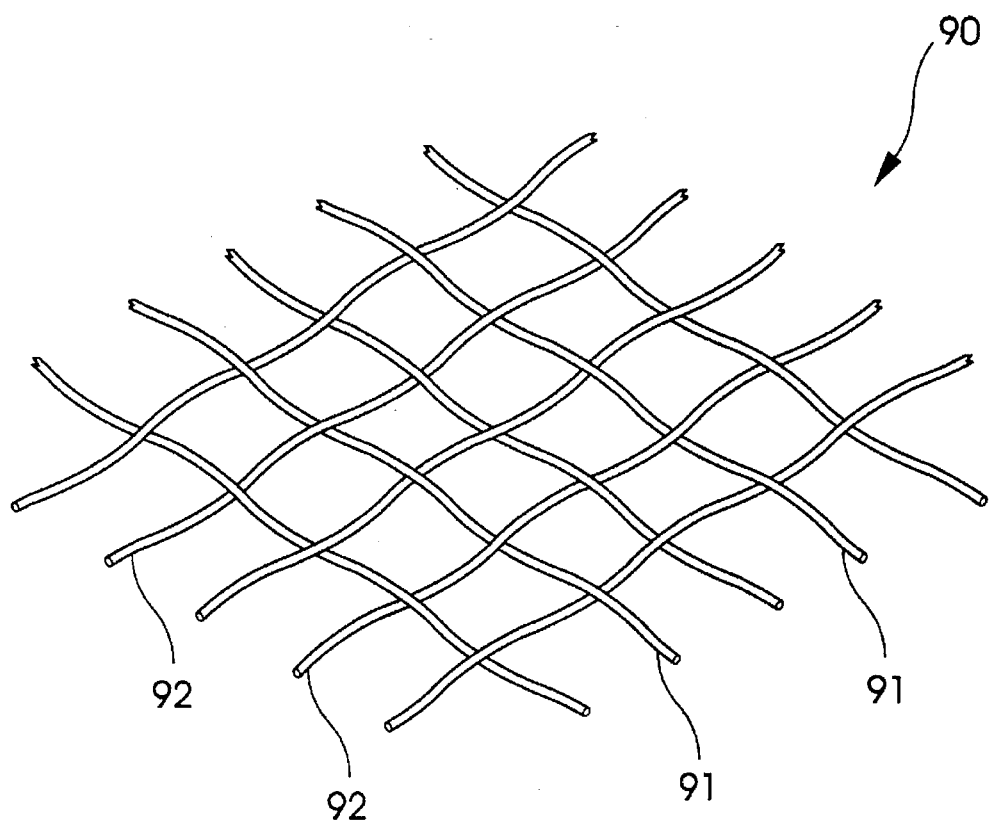
FIG. 10 is a partial perspective view of a wire form which is suitable for fabricating a structural support member which comprises a portion of the FIG. 1 filter element.

The flow path through filter element 20 begins at the exterior surface 29 of outer wall portion 22 and moves inwardly through wall portion 22, structural member 28, and then through inner wall portion 25 to the substantially cylindrical, interior passageway 30. Structural member 28 is a non-restrictive design which is intended solely for the purpose of adding structural strength to the filter element 20. Selecting a like-material for member 28 based on what is used for wall portions 22 and 25 permits the application of a common sintering step and the ability to get the desired bonding of the wall portions to the adjacent surfaces of structural member 28. In the preferred embodiment, the granular material selected for wall portions 22 and 25 is stainless steel configured as a powder metal. Accordingly, the material selected for the structural member 28 is also stainless steel. Suitable starting panel shapes and configurations for structural member 28 are illustrated in FIGS. 8, 9 and 10 and these will be described in greater detail later. The three portions which comprise filter element 20 are sintered together either in one or possibly several sintering steps. Multiple sintering steps are advantageous when a gradient pore size is desired. A successively smaller pore sizes results in higher dirt-holding capacity while a successively larger pore size is advantageous for coalescing applications. Layers of different granule sizes and/or different compaction can be sintered onto itself and the previous (adjacent) layer and/or the support member. Applications for the present invention include any environment where there are specific filtration and performance requirements.

Figure 2:
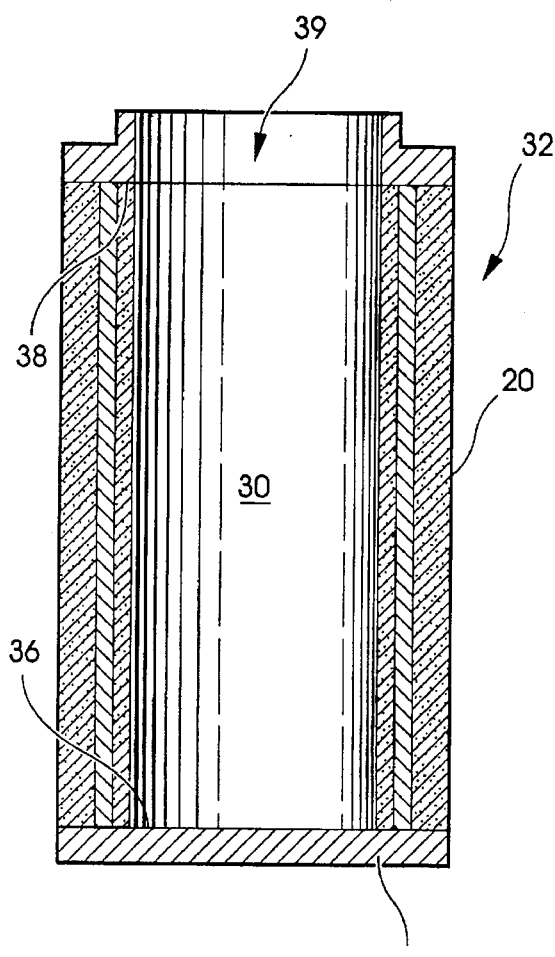
FIG. 2 is a front elevational view in full section of a filter cartridge incorporating the FIG. 1 filter element according to the present invention.
Figure 3:
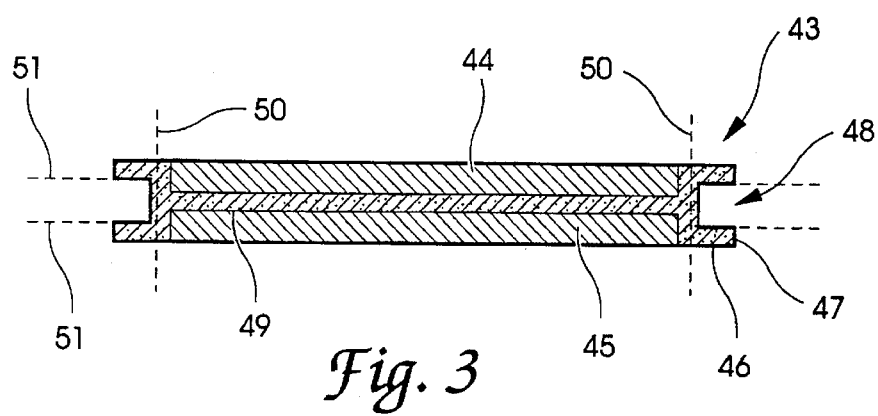
FIG. 3 is a front elevational view in full section of a filter element according to the present invention.
Figure 4:
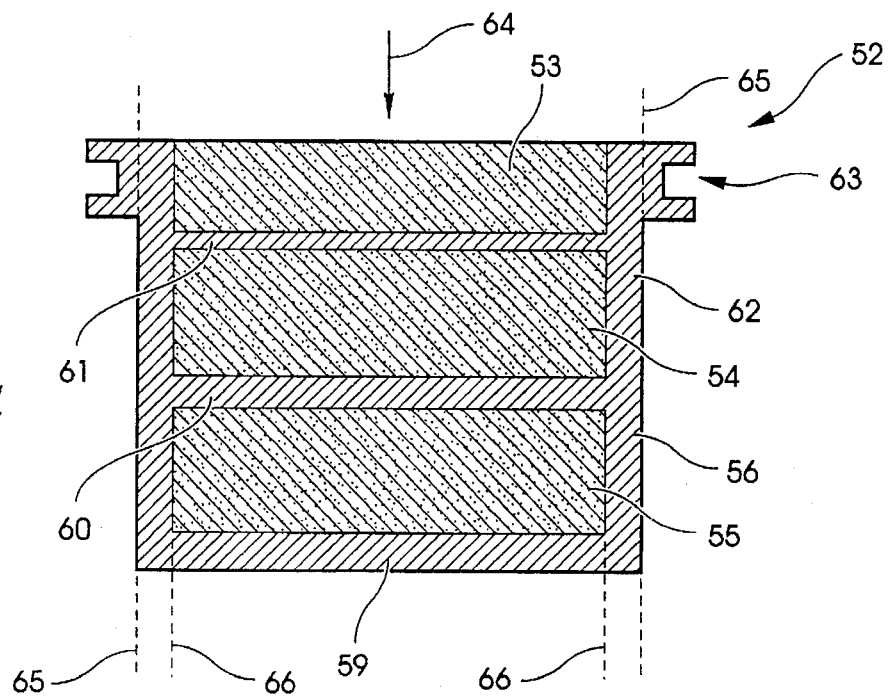
FIG. 4 is a front elevational view in full section of a filter element according to the present invention.

The present invention is appropriate for filtering situations involving temperature extremes, where there are shock and vibration concerns, the presence of corrosive or hazardous fluids, and whenever there is a desire for no media migration and incinerability. The actual shape of the fabricated filter element can be varied to fit the particular application. In FIGS. 1 and 2 the substantially cylindrical filter element 20 is illustrated while more shallow, disc-shaped elements are illustrated in FIGS. 3 and 4. Other filter element shapes such as a rectangular flat panel (FIG. 5), a cone (FIG. 6), or dome (FIG. 7) can also be fabricated according to the present invention. Since the compacting die can be fashioned for a more intricate part geometry, similar to the range of options for powder metal parts, there is in reality no limit on the varied filter element configurations which are possible.

Referring to FIG. 2, filter cartridge 32 is illustrated as including filter element 20 which is arranged with a closing base plate 33 (circular periphery) and a hollow adapter plate (circular periphery) 34. The lower edge surface 35 of element 20 is substantially flat and can be adhesively bonded or welded to the top surface 36 of plate 33 to close off passageway 30 at this location. The upper edge surface 37 of element 20 is also substantially flat and similarly bonded or welded to the bottom surface 38 of plate 34. Flow aperture 39 provides the sole exit flow path for the media being filtered by cartridge 32. In use, cartridge 32 would typically be positioned within an outer shell which is adapted and arranged to receive at an inlet a flow of the incoming media which is to be filtered and to dispense at an exit location the filtered media.

Referring now to FIG. 3, a disc-shaped filter element 43 is illustrated and includes a first substantially cylindrical filter panel 44, a second substantially cylindrical filter panel 45, and a substantially cylindrical structural support member 46. Filter panels 44 and 45 are fabricated from sintered granular particles of a suitable filtering media such as stainless steel. Member 46 which is preferably fabricated from the same material as that used for panels 44 and 45 includes an outer wall 47 which is formed with an O-ring groove 48 and a dividing panel 49. The disc-shape of element 43 and its cooperating O-ring groove 48 make element 43 suitable for placement in a substantially cylindrical conduit. The respective diameter sizes are selected so that a close fit is achieved and such that a properly sized and installed elastomeric O-ring will establish a liquid-tight interface between the periphery of filter element 43 and the inside surface of the corresponding cylindrical conduit.

In order to simplify the compacting tooling and possibly the fabrication of filter element 43, support member 46 can be fabricated from a plurality of separate members and then welded or otherwise joined together. For example, the dividing panel 49 could be integral with part of outer wall 47, line 50 being the point of separation. The remainder of the outer wall would thus provide the O-ring groove. The two outer wall portions would then be welded together. Another dividing line option could be horizontal where lines 51 are drawn. This would require welding the separate top and bottom panels (annular ring shape) that define the O-ring groove 48 to the outer wall.

Panel 44 can be thought of as being similar in construction and function to wall portion 22. Likewise, panel 45 can be thought of as being similar in construction and function to wall portion 25. Further, support member 46 is similar in function to structural member 28. As such, all of the various options as to materials, granule size, and pore size as described in connection with filter element 20 are equally and fully applicable to element 43.

Referring to FIG. 4 a multi-level or multi-stage column-shaped filter element 52 is illustrated. Filter element 52 which is substantially cylindrical includes a first disc-shaped filter panel 53 of coarse porosity, a second disc-shaped filter panel 54 of medium porosity, a third disc-shaped filter panel 55 of fine porosity, and a structural support member 56. Support member 56 includes an optional base portion 59, partitioning layers 60 and 61, outer wall portion 62, and O-ring channel 63. Due to the column or series stack of multiple filter panels with varying degrees of panel porosity, the direction of media flow is represented by arrow 64. The end use application for filter element 52 as well as the selected height and diameter will influence whether the optional base portion 59 is used.

Filter element 52 is similar in many respects to element 43 and the end use within a cylindrical conduit is the same. Panels 53, 54, and 55, except for the fact of varying degrees of porosity, can be thought of as having a design and construction which is similar to panels 44 and 45, as well as being similar to wall portions 22 and 25. The material selected for support member 56 is the same material as that selected for panels 53, 54, and 55. The different degrees of panel porosity are achieved by using different granule sizes.

In order to simplify the compacting tooling and the fabrication of filter 52, support member 56 can be fabricated from a plurality of separate members and then welded or otherwise joined together. For example the O-ring channel 63 can be separately fabricated as an annular ring sleeve with line 65 representing the cylindrical separating location. The separated O-ring sleeve is then welded to outer wall portion along line 65. Additionally base portion 59 and panels 60 and 61 would all be separate from the outer wall portion. The fabricated filter cartridge consisting of base portion 59, panels 60 and 61 and filter panels 53, 54 and 55 would be dropped down into the outer wall portion and the base portion welded to the outer wall along the cylindrical surface denoted by line 66.

With the addition of O-ring channel 63, filter element 52 would typically be cylindrical in shape and used in a conduit, as described. However, the stack of three filtering panels with different porosities is a novel structure which can be practiced in a number of different peripheral shapes, not merely cylindrical.

Figure 5:
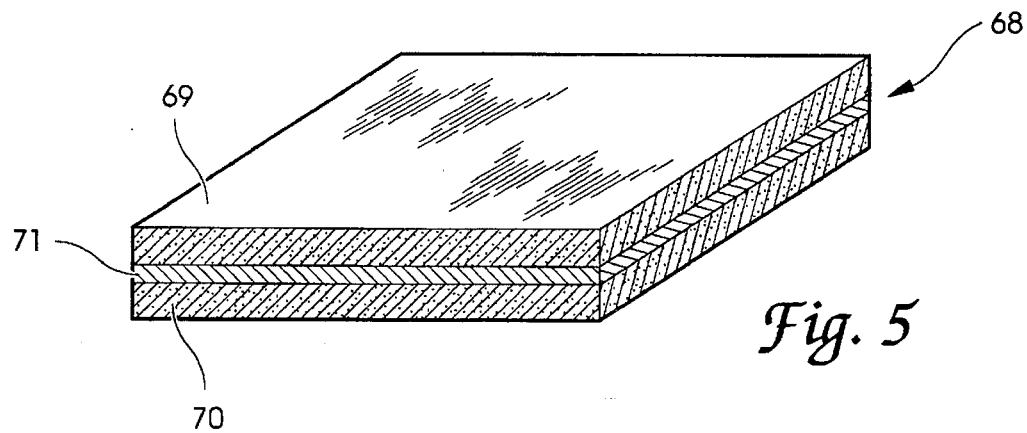
FIG. 5 is a perspective view of a filter element according to the present invention.
Figure 6:
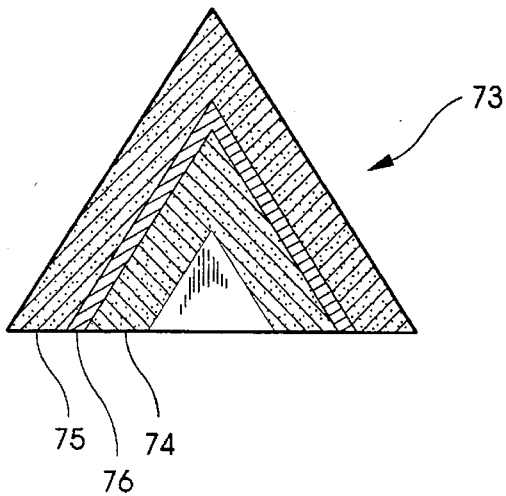
FIG. 6 is a front elevational view in full section of a filter element according to the present invention.

Referring to FIGS. 5-7, different filter element geometries, all in accordance with the present invention and all similarly structured with regard to filter element 20, are illustrated. As illustrated in FIG. 5, filter element 68 has a generally rectangular, substantially flat panel shape and includes top and bottom porous filter panels 69 and 70. Disposed between panels 69 and 70 is structural support member 71.

In FIG. 6, the full section view is of a conical filter element 73 which includes inner and outer porous filter panels 74 and 75 and structural support member 76 disposed therebetween. In FIG. 7 the full section view is of a domed (hemispherical) filter element 78 which includes inner and outer porous filter panels 79 and 80 and structural support member 81 disposed therebetween.

Referring to FIGS. 8 and 9, material panels 84 and 85 are illustrated. Panels 84 and 85 are arranged as generally rectangular sheets of relatively thin material, such as stainless steel. When coiled into a cylindrical form and secured in that fashion, either style of panel may be used for the structural member 28. The plurality of apertures 86 in panel 84 provide the non-restrictive configuration which is desired. A different shape of apertures 87 is provided in panel 85, but the purpose and function of this panel is the same as panel 84. The material used for the panels 84 and 85 may also be used, although reshaped, for the support members of FIGS. 3-7.

Referring to FIG. 10, wire form 90 is illustrated in only a partial sheet-like shape. A preferred material for wire form 90 is stainless steel and the gauge of wire will vary depending on the application. This sheet of wire form material may be used for structural member 28 and the openings which are created by the crossing strands 91 and 92 of wire provide the desired non-restrictive configuration.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A substantially cylindrical, unitized filter element for separating contaminant material from a flowing media comprises:

an outer, substantially cylindrical wall portion constructed of a first granular material which has been sintered into a first porous filtering matrix, said outer, substantially cylindrical wall portion having an outer surface which defines an entering location for the inward flow of said flowing media;

an inner, substantially cylindrical wall portion constructed of a second granular material which has been sintered into a second porous filtering matrix, said inner, substantially cylindrical wall portion having a hollow interior and defining an exit flow path for said flowing media after flowing inwardly through said inner, substantially cylindrical wall portion.; and a substantially cylindrical structural support member positioned between and sintered to said outer and inner wall portions.

2. The unitized filter element of claim 1 wherein said first and second granular materials are the same material.

3. The unitized filter element of claim 2 wherein said first and second granular materials are stainless steel.

4. The unitized filter element of claim 3 wherein said first porous filtering matrix has a first matrix density and said second porous filtering matrix has a second matrix density, said first and second matrix densities being the same.

5. The unitized filter element of claim 3 wherein said first porous filtering matrix has a first matrix density, said second porous filtering matrix has a second density, and wherein said first and second matrix densities are different, said second matrix density being the higher density.

6. The unitized filter element of claim 1 wherein said first and second granular materials are different materials.

7. The unitized filter element of claim 6 wherein said first porous filtering matrix has a first matrix density and said second porous filtering matrix has a second matrix density, said first and second matrix densities being the same.

8. The unitized filter element of claim 6 wherein said first porous filtering matrix has a first matrix density, said second porous filtering matrix has a second density, and wherein said first and second matrix densities are different, said second matrix density being the higher density.

9. A substantially cylindrical filter cartridge for separating contaminant material from a flowing media comprises:

a unitized filter element having:

an outer, substantially cylindrical wall portion constructed of a first granular material which has been sintered into a first porous filtering matrix, said outer, substantially cylindrical wall portion having an outer surface which defines an entering location for the inward flow of said flowing media;

an inner, substantially cylindrical wall portion constructed of a second granular material which has been sintered into a second porous filtering matrix, said inner, substantially cylindrical wall portion having a hollow interior and defining an exit flow path for said flowing media after flowing inwardly through said inner, substantially cylindrical wall portion; and a substantially cylindrical structural support member positioned between and sintered to said outer and inner wall portions;

a closing end plate secured to a lower end of said unitized filter element; and an upper adapter plate secured to an upper end of said unitized filter element.

10. The filter cartridge of claim 9 wherein said closing end plate is constructed and arranged to block any exiting flow from said unitized filter element via said lower end and said upper adapter plate defines a flow outlet.

11. The filter cartridge of claim 10 wherein said first and second granular materials are the same material.

12. The filter cartridge of claim 11 wherein said first and second granular materials are stainless steel.

13. The filter cartridge of claim 12 wherein said first porous filtering matrix has a first matrix density and said second porous filtering matrix has a second matrix density, said first and second matrix densities being the same.

14. The filter cartridge of claim 9 wherein said first and second granular materials are the same material.

15. The filter cartridge of claim 14 wherein said first and second granular materials are stainless steel.

16. The filter cartridge of claim 15 wherein said first porous filtering matrix has a first matrix density and said second porous filtering matrix has a second matrix density, said first and second matrix densities being the same.

17. The filter cartridge of claim 9 wherein said first and second granular materials are different materials.

* * * * *